Patented Oct. 20, 1931

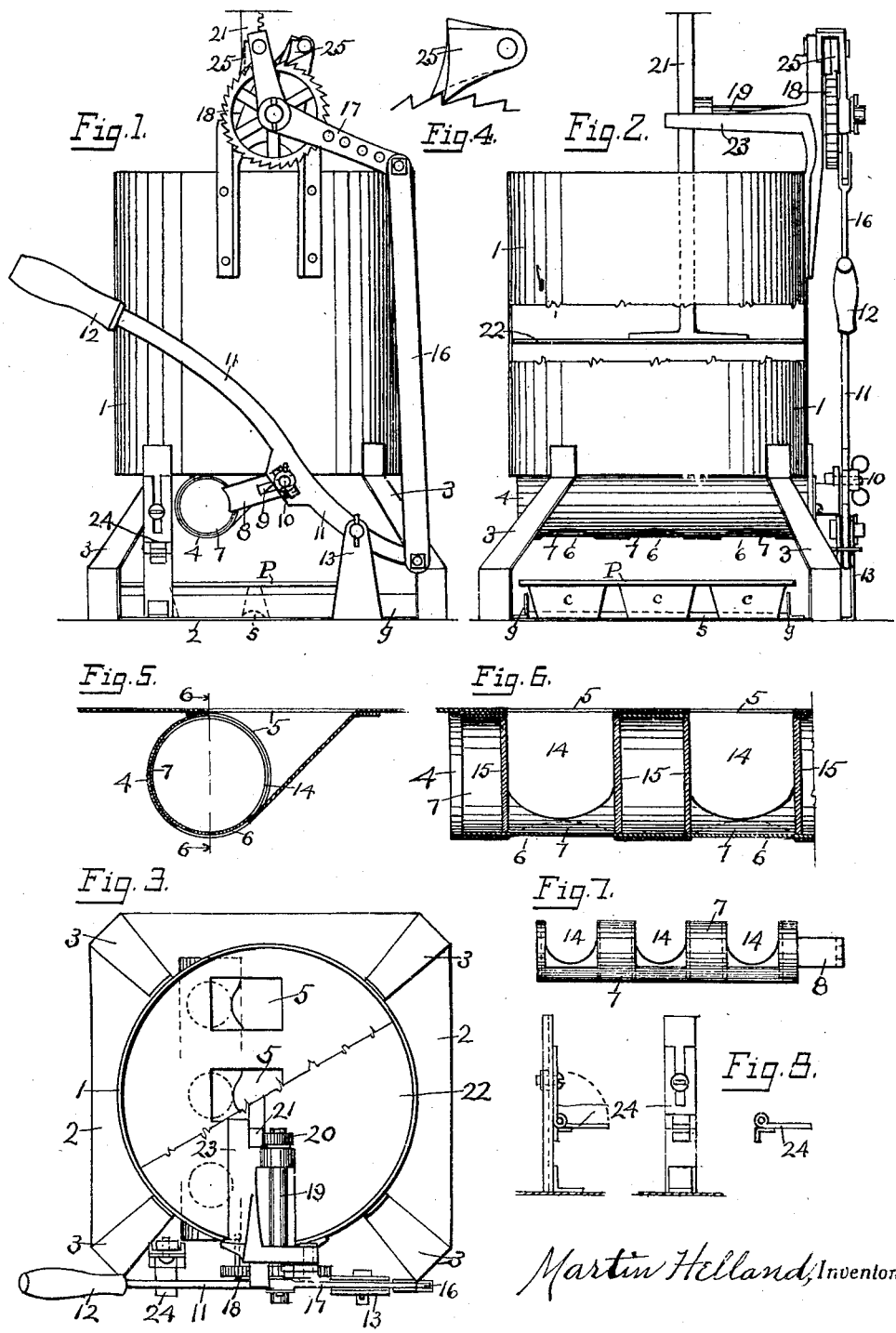

1,828,565

UNITED STATES PATENT OFFICE

MARTIN HELLAND, OF TACOMA, WASHINGTON

CUP-CAKE DROPPING MACHINE

Application filed January 18, 1930. Serial No. 421,847.

My invention relates to improvements in cup-cake-dropping machines, but may be used to advantage in all relations where it is desired to drop dough or similar materials of similar consistency into pans or moulds in predetermined or measured quantities. The objects of my invention are to provide a means whereby cup-cake pans can be filled with ease and dispatch and when filled will produce cakes of uniform size and weight. It is as hereinafter set forth an individual hand operated machine, though it is adapted to be operated by mechanical power leaving the shifting of the cup-pans to the individual.

I attain these objects by means of the mechanism illustrated in the accompanying drawings, in which—

Figure 1 is a side view of my invention; Figure 2 is a front view; and Figure 3 is a top view of the same; Figure 4 is an enlarged view of the ratchet engaging dogs; Figure 5 is an enlarged cross section through the cylindrical measuring and dough cutting device; Figure 6 is a partial lengthwise section through Figure 5; Figure 7 is a view of the dough cutting device as detached for cleaning; and Figure 8 is a suggested detail for the adjustable bracket for stopping the downward movement of the hand lever arm at the desired point.

The same reference characters indicate the same parts in the several views.

Referring to the drawings, it will be seen that my invention comprises a dough container 1 of cylindrical form, to be constructed of suitable metal and supported in an upright position above a metal square base 2 by four standards inwardly inclined from the four corners of the base as indicated at 3. Under the container 1 is fixed a small horizontal cylinder 4 with upwardly inclined side intake openings through the bottom of the dough container 1. These openings 5—5 will be seen by referring to Figures 3, 5 and 6. A round outlet opening for each of these intakes is shown at 6 in each of the figures mentioned. This small horizontal cylinder is designed to contain a cylindrical measuring and cutting device 7 to be neatly fitted therein and operated by an oscillating movement. The oscillating movement is attained through a crank-like extension from one end as shown at 8. An open-ended slot 9 in this extension engages an adjustable stud 10 fixed by a thumb screw in the handle lever arm 11 which is operated by the handle 12.

It will be seen the handle arm 11 is pivotally mounted in the upright bearing 13 and by pushing the handle 12 down and then up, the outlets 6 will be opened and closed by the oscillating, rotative movement of the cylindrical cutting device 7. By referring to Figures 5 and 6 it will be seen that the openings 14 in the cylindrical cutting device 7 register with the intake and outlet openings referred to in the cylinder 4. It will also be seen that each opening is made separate and distinct by disk bulkheads or partitions 15. Thus each opening 14 is made complete and uniform as a means for accurately measuring the dough as it passes through the outlets 6.

Simultaneously with the operation of the measuring and cutting device, there is another part of my invention that puts a continuous uniform pressure on the dough or batter within the container 1, whereby every discharge through each of the outlets 6 will be uniform in quantity.

It is shown that the handle lever arm 11 is extended beyond its pivotal bearing 13 and has an upright reciprocating shaft 16 attached to its extended end. The top end of the upright shaft 16 is pivotally attached to the operative arm of an L-shaped lever 17 which operates a ratchet wheel 18 fixed on a small shaft 19, and on which the L-shaped lever is loosely pivotally mounted. The shaft 19 extends to near the center of the container 1 and has a small gear wheel 20 fixed on its end, where it engages a vertical rack 21 on the lower end of which is fixed a piston-like disk 22 neatly fitted to the interior of the cylindrical container 1. It will be seen the shaft of the ratchet and pinion is mounted in a bearing frame 23 mounted on the side of the container 1 and extends above and over the top of same.

It will now be seen that with each downward push on the handle 12, the disk piston 22 will likewise be pushed down by the pinion 20 and thus keep a uniform pressure on the dough as a certain quantity passes out through the outlets 6. By the uniform pressure on the dough in the container and the measuring and cutting mechanism, as described and shown, it is obvious the cup-cake droppings will be of uniform size and weight.

The rack 21 is fixed to one side of the center of the piston disk 22 in order to make it lean or bear against or into the opening between the pinion 20 and the supporting frame 23. It will thus be held in constant engagement with the pinion 20 by the one sided pressure of the disk on the dough. After the container is empty, the rack 21 can be slipped out of engagement and the disk lifted out for refilling the container.

The several parts of my invention are made adjustable, not only to secure a uniformity of pressure and discharge, but to secure larger or smaller quantities in the droppings as may be desired. A series of holes are made in the operative arm of the ratchet lever 17 to increase or lessen the downward movement of the dough pressing disk 22. The thumb screw stud 10 is likewise made adjustable by means of a slot shown in the handle lever arm 11 whereby the cutting device will open the outlets more or less. The downward movement of the handle lever arm 11 is controlled by an adjustable bracket 24, the details of which are suggested by views shown in Figure 8. The bracket 24 is hinged in order that it may be turned up to clear the lever arm when desired to allow the lever arm to be pushed down till the stud 10 will clear the open-ended slot 9. The cylindrical cutting and measuring device 7 can then be slipped out of the small cylinder 4 and be cleaned at the end of the working time. These several adjustable features make my invention both practical and economical in construction and operation.

One of the important features of the present device is clearly shown in Figures 1 and 5. It will be noted that the discharge opening 14, of the rotary measuring valve or cylinder 4 extends practically 180° around the periphery of said cylinder, so that when the cylinder is rotated, for the purpose of discharging dough into the pans, the outlet opening 6 will be completely open, while the opening 14 remains in practically semi-open position to the interior of the container. Thus, by reason of the fact that the pressure on the dough is exerted at the same time that the cylinder is in position to uncover the opening 6, such pressure, on the dough, will force the dough directly through the partial opening 14, and the opening 6, into the cups of the pan, therebeneath. Also, by adjusting the member 24 upwardly or downwardly, the degree to which the outlet 14 is opened may be readily regulated, and thereby the charge of dough gauged.

Another feature as an aid to the means for adjustment is in the duplex dogs 25 on the ratchet wheel 18 and more clearly shown in Figure 4. The dogs are made in pairs, each pair being mounted on its respective pivot. One point of each pair of dogs is somewhat longer than the other so that each dog of each pair will engage the ratchet alternately as shown. By this means, both the operating and the holding dogs will grip each tooth of the ratchet wheel twice and thus utilize a smaller movement than if single dogs were used.

The invention is designed to be set upon a work table of suitable height. The container being filled, the operator stands in front of the machine as seen in Figure 2. With the left hand the cup-pans P are set under the machine as shown, the side guides $g$ and the cross stop $s$ enabling each cup $c$ to be centered under the outlets 6. With the right hand, the handle 12 is pushed down until the lever arm contacts with the bracket 24, then raised back to the position shown. The first row of cups will now have been filled, the pan P will be moved forward to the next row of cups and the operation repeated. In this way the work will be continued indefinitely with ease and accuracy.

Having described my invention, I claim:—

1. A cup-cake dropping machine including a dough container having an outlet opening, a cylinder associated with the opening for receiving dough from the container, a rotary valve within the cylinder for transmitting dough from the container to a receptacle placed therebeneath, means for exerting a constant pressure on the dough within the container, and means the initial movement of which simultaneously operates the valve into dough transmitting position and the pressure means whereby the pressure will be the same at each discharge of dough and the final movement of which closes the valve and cuts off the dough.

2. A cup-cake dropping machine including a dough container having outlets, means for exerting a constant pressure on the dough within the container, a valve in position to receive dough from the container, and movable into position to simultaneously receive and discharge dough, means for simultaneously opening the valve into dough discharging position and for operating the pressure exerting means, said operating means including a lever, and means for regulating the throw of said lever whereby to regulate the opening movement of the said valve.

3. A cup-cake dropping machine including a dough container having an outlet, a casing associated with said outlet and having a dough receiving opening and a dough discharging outlet, a rotary valve in the casing having an opening adapted for registration at times with the receiving opening of the casing, and at times with the receiving opening and said discharge outlet simultaneously whereby to maintain communication with the interior of the container when in register with the casing outlet, means for simultaneously exerting pressure on the dough within the container and for opening said rotary valve, and means for regulating the opening movement of said valve.

4. A cup-cake dropping machine including a dough container having an outlet in the bottom thereof, means within the container for pressing the dough toward said outlet, a casing associated with the outlet in position to receive dough therefrom and having an outlet, and a rotary valve within the casing having an opening of a size to register with the outlet opening of said container, when the valve is in closed position, and to simultaneously register with the container outlet and said casing outlet, when said valve is in open position.

5. A cup-cake dropping machine including a dough container having an outlet, means within the container for pressing the dough toward said outlet at a constant pressure, a rotary valve associated with said outlet and having an opening of a size to register with the outlet opening of said container to receive therefrom, at times, and to provide a dough transmitting passage directly from the container, at times, said pressure means including a dough engaging disk, and means for simultaneously opening said valve and operating said pressure means including a lever operatively connected with said valve, and means operable by said lever for moving said disk against the dough upon opening movement of said valve.

Signed at Tacoma, county of Pierce, State of Washington, this 13th day of May, 1930.

MARTIN HELLAND.